(12) United States Patent
Sharifi et al.

(10) Patent No.: US 9,569,532 B1
(45) Date of Patent: Feb. 14, 2017

(54) MELODY RECOGNITION SYSTEMS

(71) Applicant: Google Inc., Mountain View, CA (US)

(72) Inventors: Matthew Sharifi, Palo Alto, CA (US); Dominik Roblek, Mountain View, CA (US); Vera Dron, Saint Petersburg (RU); Ioannis Agiomyrgiannakis, London (GB)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 14/300,600

(22) Filed: Jun. 10, 2014

Related U.S. Application Data

(63) Continuation of application No. 13/776,017, filed on Feb. 25, 2013, now Pat. No. 9,008,490.

(51) Int. Cl.
*H04N 5/92* (2006.01)
*G06F 17/30* (2006.01)

(52) U.S. Cl.
CPC ..... *G06F 17/3082* (2013.01); *G06F 17/30787* (2013.01)

(58) Field of Classification Search
CPC .............. G11B 27/105; G11B 2220/2562; G11B 27/329; H04N 5/85; H04N 9/8042; G06F 17/30787
USPC .................................................. 386/239, 241
See application file for complete search history.

(56) References Cited

U.S. PATENT DOCUMENTS

| | | | |
|---|---|---|---|
| 5,499,922 A * | 3/1996 | Umeda | G10H 1/0066 434/307 A |
| 7,788,279 B2 | 8/2010 | Mohajer | |
| 7,881,657 B2 | 2/2011 | Wang | |
| 8,041,734 B2 | 10/2011 | Mohajer | |
| 8,086,171 B2 | 12/2011 | Wang | |
| 8,190,435 B2 | 5/2012 | Li-Chun | |
| 8,290,423 B2 | 10/2012 | Wang | |
| 2008/0236366 A1 * | 10/2008 | Van Os | G06F 17/30743 84/609 |
| 2009/0024388 A1 * | 1/2009 | Pandiscio | G06F 17/30743 704/231 |
| 2009/0300008 A1 | 12/2009 | Hangartner | |
| 2012/0029670 A1 | 2/2012 | Mont-Reynaud | |

(Continued)

OTHER PUBLICATIONS

Notice of Allowance issued in U.S. Appl. No. 13/776,017 on Jan. 22, 2015, 9 pages.

(Continued)

*Primary Examiner* — William Tran
(74) *Attorney, Agent, or Firm* — Fish & Richardson P.C.

(57) ABSTRACT

Methods, systems, and apparatus, including computer programs encoded on a computer storage medium, for selecting, from among a collection of videos, a set of candidate videos that (i) are identified as being associated with a particular song, and (ii) are classified as a cappella video recordings; extracting, from each of the candidate videos of the set, a monophonic melody line from an audio channel of the candidate video; selecting, from among the set of candidate videos, a subset of the candidate videos based on a similarity of the monophonic melody line of the candidate videos of the subset with each other; and providing, to a recognizer that recognizes songs from sounds produced by a human voice, (i) an identifier of the particular song, and (ii) one or more of the monophonic melody lines of the candidate videos of the subset.

21 Claims, 3 Drawing Sheets

(56) References Cited

U.S. PATENT DOCUMENTS

| | | | |
|---|---|---|---|
| 2012/0036156 A1 | 2/2012 | Mohajer | |
| 2012/0124177 A1* | 5/2012 | Sparks | G06Q 20/123 709/219 |
| 2012/0308196 A1* | 12/2012 | Bowman | G06F 17/30775 386/230 |
| 2013/0322765 A1* | 12/2013 | Neumann | G06K 9/00765 382/197 |
| 2014/0122458 A1* | 5/2014 | Kong | G06F 17/30047 707/710 |

OTHER PUBLICATIONS

Office Action issued in U.S. Appl. No. 13/776,017 on Jan. 16, 2014, 21 pages.
Office Action issued in U.S. Appl. No. 13/776,017 on Jul. 18, 2014, 21 pages.

\* cited by examiner

MELODY RECOGNITION SYSTEMS

CROSS REFERENCE TO RELATED APPLICATION

This application is a continuation of U.S. application Ser. No. 13/776,017, filed Feb. 25, 2013, the contents of which is incorporated by reference.

FIELD

The present specification relates to identifying audio content.

BACKGROUND

An individual may hear a song on the radio or in a public establishment, or may hear a person singing a song, and may want to later acquire the song by purchasing the song from an online music distribution service. However, without having textual information associated with the song, the individual generally has no good way of finding the song to purchase.

SUMMARY

According to some innovative aspects of the subject matter described in this specification, a monophonic melody line of a polyphonic audio signal is isolated, e.g., of an audio channel of a video recording, and associated with an identifier of the song. For example, a collection of videos are filtered to select a set of candidate videos that are associated with the identifier of the song, and that are characterized as a cappella video recordings. The collection of videos can be filtered based on keywords associated with the videos. For example, the set of candidate videos can be associated with the identifier, e.g., "tagged" with the particular song name, and can be classified as a cappella video recordings, e.g., tagged with keywords associated with a cappella.

From the set of candidate videos, monophonic melody lines are extracted from each of the candidate videos and compared to one another to obtain a subset of the candidate videos. The subset of candidate videos includes candidate videos that are similar to one another based on the monophonic melody lines of the candidate videos of the subset. The monophonic melody lines associated with the subset of candidate videos can thus be a representative monophonic melody line that is associated with the identifier.

In some examples, a user is interested in knowing a title of a song, but the user doesn't remember much about the song, other than the melody of the song. To that end, the user can hum the melody into a mobile device. The hummed melody can be matched to the representative monophonic melody line, and the associated identifier can provided to the user.

Innovative aspects of the subject matter described in this specification may be embodied in methods that include the actions of selecting, from among a collection of videos, a set of candidate videos that (i) are identified as being associated with a particular song, and (ii) are classified as a cappella video recordings; extracting, from each of the candidate videos of the set, a monophonic melody line from an audio channel of the candidate video; selecting, from among the set of candidate videos, a subset of the candidate videos based on a similarity of the monophonic melody line of the candidate videos of the subset with each other; and providing, to a recognizer that recognizes songs from sounds produced by a human voice, (i) an identifier of the particular song, and (ii) one or more of the monophonic melody lines of the candidate videos of the subset.

Other embodiments of these aspects include corresponding systems, apparatus, and computer programs, configured to perform the actions of the methods, encoded on computer storage devices.

These and other embodiments may each optionally include one or more of the following features. For instance, identifying text associated with the collection of videos, and identifying one or more keywords associated with the text, wherein selecting the set of candidate videos further includes selecting the set of candidate videos based on the one or more keywords associated with the text. The text associated with the collection of videos includes one or more of tags, metadata, comments, labels, or attributes associated with one or more videos of the collection of videos, or a transcription of an audio portion of one or more videos of the collection of videos. Identifying the one or more keywords further includes identifying one or more keywords that are associated with the particular song or associated with a cappella music, and wherein selecting the set of candidate videos further includes selecting the set of candidate videos that are associated with the identified one or more keywords. Selecting the subset of the candidate videos further includes comparing the monophonic melody line of one or more videos from the set of candidate videos with the monophonic melody line of one or more remaining videos from the set of candidate videos. Generating a graph based on the comparison, the graph representing the subset of the candidate videos and including one or more nodes representing the candidate videos and including one or more edges between the one or more nodes representing the similarity between the subset of the candidate videos. Comparing the similarity associated with each edge to a threshold, and filtering the one or more edges based on the comparison. Filtering further includes removing the one or more edges from the graph. Each node includes an edge to each other node of the graph. A particular node of the one or more nodes includes an edge to a proper subset of the one or more nodes of the graph.

The features further include, for example, selecting the subset of candidate videos further includes selecting a clique of candidate videos. Selecting the subset of candidate videos further includes selecting a paraclique of candidate videos. Identifying two or more subsets of the candidate videos, each subset of the two or more subsets of the candidate videos are based on a similarity of the monophonic melody lines of the candidate videos of the respective subset of the candidate videos. Selecting the subset of the candidate videos further includes selecting the subset of the candidate videos from the two or more subsets of the candidate videos based on a number of candidate videos associated with each respective subset of the candidate videos. The selected subset of the candidate videos includes a number of candidate videos greater than a number of candidate videos associated with each remaining subset of candidate videos of the one or more subsets of candidate videos. The sounds produced by the human voice include singing, humming, speaking, and vocal cord sounds. Associating the identifier of the particular song with the one or more monophonic melody line of the candidate videos of the subset. Storing the association in a database. The a cappella video recordings can include audio portions of one or more persons producing vocal sounds without instrumental sound.

The details of one or more embodiments of the subject matter described in this specification are set forth in the accompanying drawings and the description below. Other

DESCRIPTION OF DRAWINGS

Like reference symbols in the various drawings indicate like elements.

DETAILED DESCRIPTION

Figure 1:
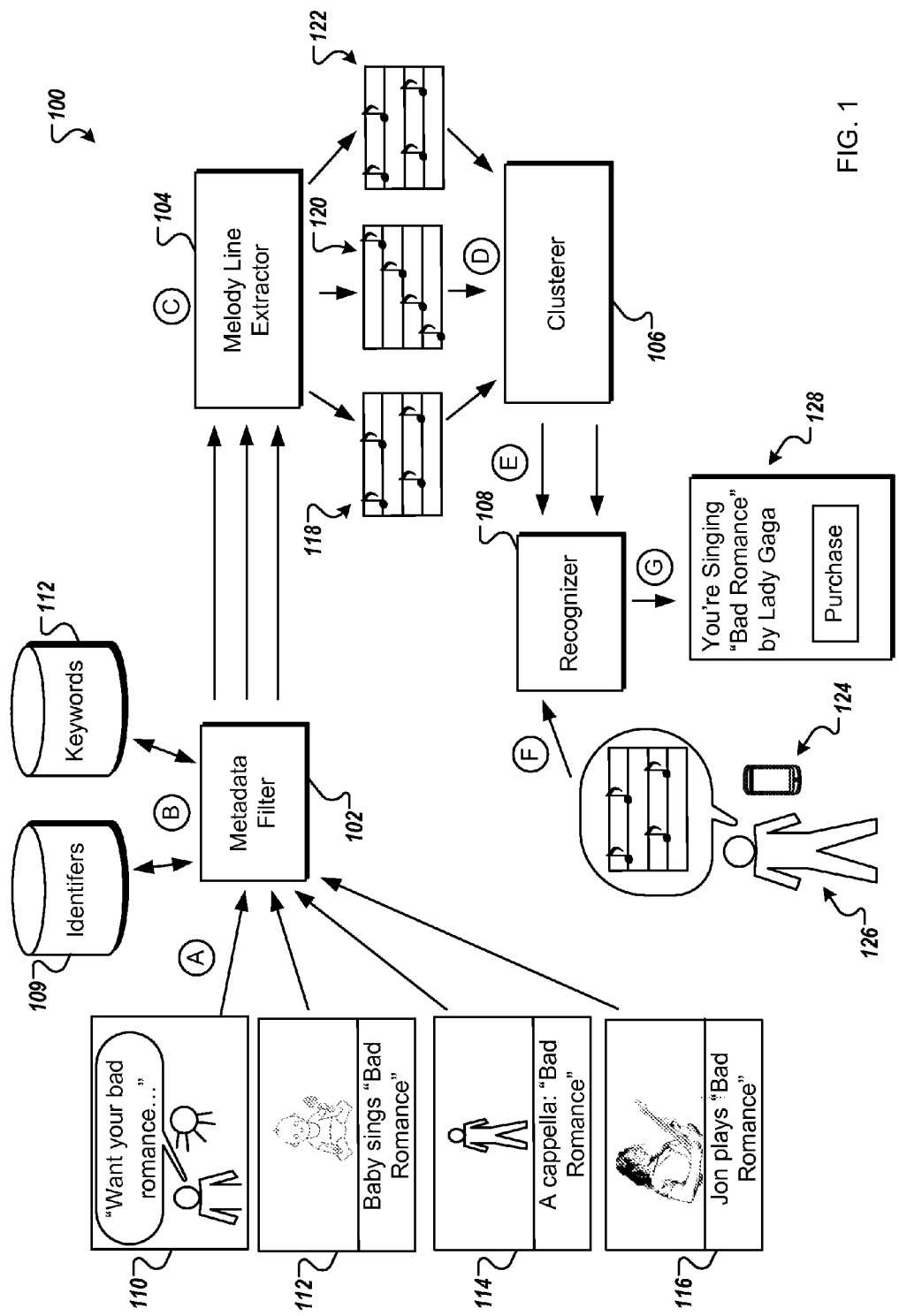
FIG. 1 depicts an example system for isolating a monophonic melody line of a polyphonic audio signal.

FIG. 1 depicts a system 100 for isolating a monophonic melody line of a polyphonic audio signal, e.g., of an audio track of a video recording. Briefly, the system 100 can associate a monophonic melody line of the polyphonic audio signal with one or more identifiers, such as a song name or artist name. The system includes a metadata filter 102, a melody line extractor 104, a clusterer 106, a recognizer 108, an identifier database 109, and a keyword database 112. The metadata filter 102, the melody line extractor 104, the clusterer 106, and the recognizer 108 are in communication over one or more networks.

In some embodiments, the metadata filter 102 receives a collection of videos, e.g., over a network, during operation (A). For example, the metadata filter receives videos 110, 112, 114, 116, including associated metadata of the videos 110, 112, 114, 116. In some examples, the video 110 can be associated with a person singing the song "Bad Romance" in the shower; the video 112 can be associated with a baby singing the song "Bad Romance" and can include the title "Baby sings 'Bad Romance';" the video 114 can be associated with a person singing an a cappella version of the song "Bad Romance" and can include the title "A cappella: 'Bad Romance';" and the video 116 can be associated with a person performing an instrumental version of the song "Bad Romance" and can include the title "Jon plays 'Bad Romance'."

The metadata filter 102 filters the videos 110, 112, 114, 116, e.g., a low threshold filter, based on one or more signals, e.g., criteria, during operation (B). Specifically, the metadata filter 102 processes the videos 110, 112, 114, 116 and the associated metadata of the videos 110, 112, 114, 116 to select a set of candidate videos that are associated with a particular song, i.e., a first signal, or criteria and that are classified as a cappella video recordings, i.e., a second signal, or criteria. The particular song identifier, or other identifier, that the videos 110, 112, 114, 116 are filtered by can be stored by the identifiers database 109, and communicated to the metadata filter 102, e.g., over a network. For example, the metadata filter 102 filters the videos 110, 112, 114, 116 in view of the particular song "Bad Romance" by Lady Gaga, e.g., the first signal, or criteria. In some examples, the metadata filter 102 determines that a transcription of the video 110 includes lyrics associated with the particular song "Bad Romance," e.g., "Want your bad romance . . . ". Additionally, for example, the metadata filter 102 determines that the videos 112, 114, 116 are associated with metadata indicating an association with the particular song "Bad Romance," e.g., the titles including the words "Bad Romance".

In some examples, the metadata filter 102 filters the videos 110, 112, 114, 116 in view of one or more keywords that associated with a cappella video recordings, e.g., the second signal, or criteria. The one or more keywords that are used to filter the videos 110, 112, 114, 116 can be stored by the keywords database 112, and communicated to the metadata filter 102, e.g., over a network. For example, the metadata filter 102 determines that videos 112 and 114 are associated with keywords "sings" and "a cappella," respectively, and thus are selected for inclusion in the set of candidate videos, e.g., inclusion keywords. Additionally, for example, the metadata filter 102 determines that video 116 is associated with the keyword "plays," and thus, is not selected for inclusion in the set of candidate videos, e.g., exclusion keywords. For example, the keyword "plays" indicates that the video 116 is associated with an instrumental performance, and not an a cappella performance. Further, for example, the metadata filter 102 determines that the video 110 is associated with a person singing, e.g., by obtaining a transcription of the video 110, and thus, is selected for inclusion in the set of candidate videos. In some examples, the video 110 can further be associated with one or more keywords that are associated with the one or more inclusion keywords.

The melody line extractor 104 receives the set of candidate videos from the metadata filter 102. For example, the set of candidate videos, after being filtered from the collection of videos 110, 112, 114, 116 by the metadata filter 102, includes videos 110, 112, 114. In some examples, each of the videos of the set of candidate videos, e.g., videos 110, 112, 114 includes a monophonic melody line. For example, the melody line extractor 104 extracts a monophonic melody line from each of the videos 110, 112, 114, e.g., the set of candidate videos, from an audio channel of each respective video, during operation (C). For example, the monophonic melody lines 118, 120, 122 are associated with the videos 110, 112, 114, respectively. In some examples, a monophonic melody can include a linear succession of musical tones.

The clusterer 106 receives the monophonic melody lines 118, 120, 122 associated with the set of candidate videos 110, 112, 114 from the melody line extractor 104. The clusterer 106 selects a subset of the candidate videos from the set of candidate videos 110, 112, 114 based on a similarity of the monophonic melody lines 118, 120, 122 with each other, e.g., a high grade filter, at operation (D). For example, the clusterer 106 processes the monophonic melody lines 118, 120, 122 to determine the similarity between each pair of the monophonic melody lines 118, 120, 122, e.g., monophonic melody lines pairs 118, 120; 118, 122; 120, 122. The clusterer 106 determines that the monophonic melody line pair 118, 122 are similar, e.g., based on a similarity threshold, and further determines that the monophonic melody line pair 118, 120 and 120, 122 are not similar, e.g., based on the similarity threshold. The clusterer 106 can select the subset of the candidate videos to include the videos 110 and 114 that are associated with the monophonic melody lines 118 and 122.

The clusterer 106 provides the monophonic melody lines 118 and 122 of the videos 110 and 114, e.g., the subset of candidate videos, and the identifier of the particular song, e.g., identifier associated with the song "Bad Romance" to the recognizer 108, at operation (E).

The recognizer 108 receives an audio input signal from a mobile communications device 124, e.g., over a network, at operation (F). In some examples, the recognizer 108 can recognize songs from sounds produced by a human voice. For example, a user 126 associated with the mobile device 124 wants to know information about a song, e.g., an artist of the song or title of the song, but the user 126 doesn't remember much about the song, other than the melody of the song, or the melody of a portion of the song. The user 126 can hum, and/or produce other sounds, into the mobile device 124 to provide the melody of the song, e.g., a portion of the melody of the song from the user's memory. The mobile device 124 detects such humming, e.g., through an application executed by the mobile device, and generates an audio signal based on such detected humming. The mobile device 124 can provide at least a portion of the audio signal to the recognizer 108. In some examples, the mobile device 124 can provide the audio signal as the person is humming, e.g., continuously, or after the user 126 is done humming the melody, e.g., after the user indicates completion or after a predetermined time period.

The recognizer 108 provides identification information 128 related to the audio input signal to the mobile device 124, e.g., over a network, at operation (G). Specifically, the recognizer 108 recognizes the input audio signal, e.g., the humming of the melody line provided by the user 126, and matches the input audio signal to the monophonic melody lines of the subset of the candidate videos. Based on such a match, the recognizer 108 provides the corresponding identifier associated with the monophonic melody lines of the subset of the candidate videos to the mobile device 124. For example, the recognizer 108 recognizes that the input humming, e.g., monophonic melody, provided by the user 126 is matched with the monophonic melody lines 118 and 122 that are associated with the videos 110 and 114, respectively. Based on such a match, the recognizer 108 provides the song identifier "Bad Romance," e.g., that is associated with the videos 110 and 114, to the user 126 via the mobile device 124.

In some examples, the identification information 128 can include the name of the song, the name of the singer/band/music ensemble associated with the audio input signal, and other possible information, e.g., an advertisement or a link to purchase the song. In some examples, the recognizer can provide such identification information 128 through an application, or other communication mechanisms such as a text message or an e-mail.

Figure 2:
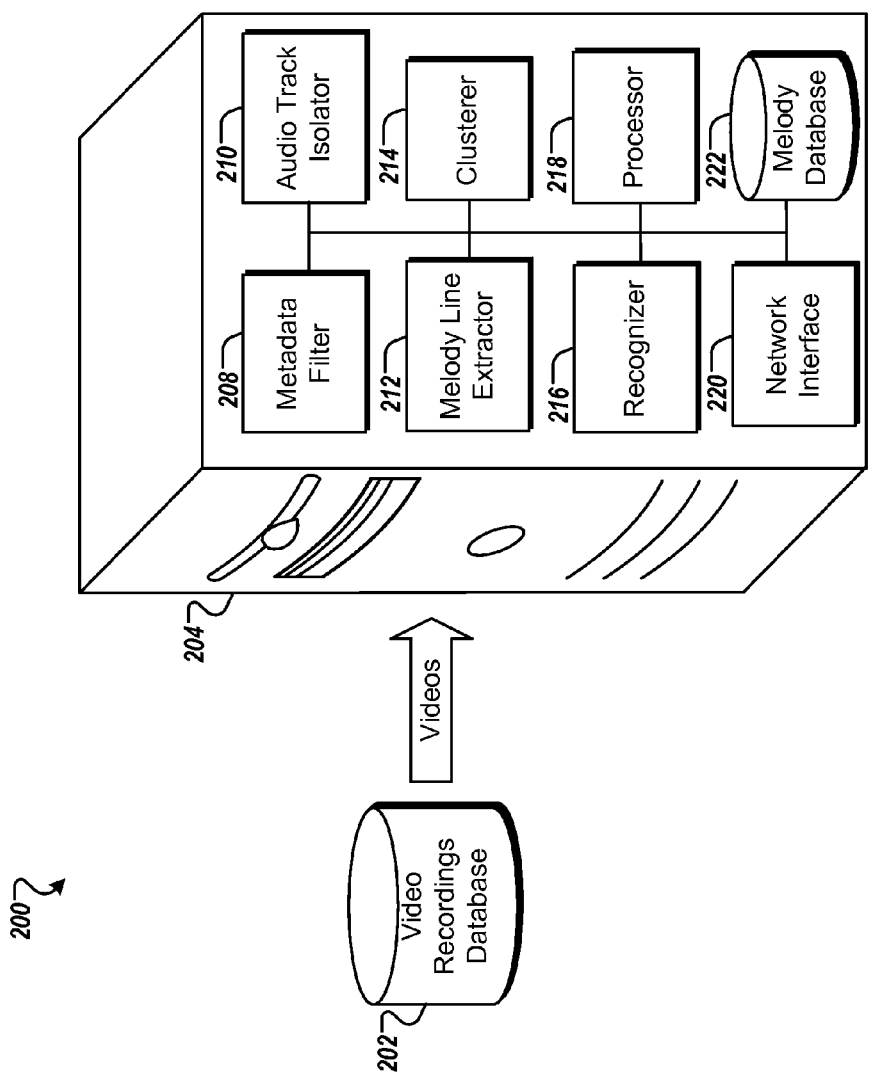
FIG. 2 depicts an example system for associating a monophonic melody line with an identifier.

FIG. 2 is a system 200 for associating a monophonic melody line with an identifier. The system includes a video recordings database 202 and a computing system 204. The recordings database 202 and the computing system 204 are in communication over one or more networks.

The video recordings database 202 includes, or provides access to, one or more video recordings, e.g., the collection of video recordings, including associated metadata of the one or more video recordings. The video recordings database 202 provides the one or more video recordings, including the associated metadata, to the computing system 204, e.g., over a network. In some examples, the video recordings database 202 includes two or more databases, e.g., a distributed database network, or a geographically-distributed database network. In some examples, the video recordings database 202 provides the one or more video recordings, including the associated metadata, in response to a triggering action, e.g., in response to a request, or continuously, e.g., as new video recordings are associated with/uploaded to the video recordings database 202. In some examples, the video recordings database 202 can provide the one or more video recordings including a video portion, e.g., video channel, and an audio portion, e.g., audio channel, or including an audio portion with a "blank" video portion, e.g., a "blank" video that includes only audio. In some examples, the video recordings database 202 can provide a portion of the one or more video recordings.

In some examples, the one or more video recordings associated with the video recordings database 202 can include any type of video recording, such as user-submitted videos, e.g., users having an account with a video-upload service that is associated with the video recordings database 202. In some examples, the one or more video recordings associated with the video recordings database 202 can be associated with text. The text can include tags, metadata, comments, labels, or attributes that is associated with the one or more video recordings. The text can further include a transcription of an audio portion of the one or more video recordings.

The computing system 204 includes a metadata filter 208, an audio track isolator 210, a melody line extractor 212, a clusterer 214, a recognizer 216, a processor 218, a network interface 220, and a melody database 222. The metadata filter 208, the melody line extractor 212, the clusterer 214, and the recognizer 216 are analogous to the metadata filter 102, the melody line extractor 104, the clusterer 106, and the recognizer 108, respectively, of FIG. 1. In some examples, the computing system 204 can include two or more computing systems, e.g., a distributed computing system, or a "cloud" computing system.

The metadata filter 208 receives the collection of video recordings from the video recordings database 202, e.g., utilizing the network interface 220. In some examples, the collection of video recordings can include a subset of the "universe" of video recordings, e.g., the comprehensive collection of video recordings, associated with the video recording database 202. For example, the subset can include the top videos, e.g., top 100,000 videos, as determined by a predetermined criteria, e.g., most viewed, most popular according to a ratings system, etc. The metadata filter 208 processes the collection of video recordings, including selecting a set of the candidate videos that are (i) identified as being associated with a particular song, and (ii) are classified as a cappella video recordings.

Specifically, in some examples, the metadata filter 208 identifies the text associated with each candidate video of the collection of video recordings received from the video recordings database 202 and identifies one or more keywords associated with the text. In some examples, the metadata filter 208 filters the collection of video recordings based on the one or more keywords of the text associated with the collection of video recordings. In some examples, the metadata filter 208 filters the collection of video recordings based on the text including one or more keywords indicating that a corresponding video, e.g., corresponding to the text, is associated with a particular song. For example, the one or more keywords can include a song name/title of the particular song.

In some implementations, the metadata filter 208 filters the collection of video recordings based on the text including one or more keywords indicating that a corresponding video, e.g., corresponding to the text, is associated with a cappella music, e.g., the video recordings include a cappella video recordings. In some examples, a cappella music, e.g., the audio portion/channel of the a cappella video recordings, can include one or more persons producing human sounds, e.g., vocal sounds, without instrumental sound, e.g., instrumental accompaniment or instrumental backing. For example, a cappella music can include one person producing human sounds, e.g. vocal sounds, or multiple persons producing human sounds, e.g., vocal sounds. For example, human sounds can be any type of vocal cord sounds, such as humming, singing, and talking. In some examples, humming can include a wordless tone produced by a human with the mouth open or closed and can include noise that emerges from the mouth, the nose, or both. In some examples, singing can include musical sounds produced by a human voice, e.g., including tonality and/or rhythm. In some examples, talking can include human speech. In some examples, a cappella music can include monophonic audio. In some examples, a cappella music does not include audio including instrumental accompaniment, e.g., an instrumental music ensemble, or an instrumental band. In some examples, a cappella music does not include a karaoke performance, e.g., a person singing with recorded music. In some examples, a cappella music does not include choral groups, e.g., a choir. In some examples, the one or more keywords indicating that the corresponding video, e.g., corresponding to the text, is associated with a cappella music can include such keywords as "a cappella," "sings," "me singing," and "cover."

In some implementations, the metadata filter 208 filters the collection of video recordings based on the one or more keywords of the text associated with the collection of video recordings, including removing one or more video recordings from the set of candidate videos based on the one or more keywords of the text associated with the collection of video recordings. For example, the one or more exclusion keywords can include such keywords as "plays" or "band."

The audio track isolator 210 receives the subset of video recordings from the metadata filter 208. In some implementations, the audio track isolator 210 isolates the audio channel of one or more, or each, of the video recordings of the subset of video recordings, e.g., isolates the audio channel from the video channel, to provide an audio channel of the one or more, or each, of the video recordings of the subset of video recordings. In some examples, audio track isolation 210 can include separation of the audio channel of the video recording from the video channel utilizing one or more audio channel isolation algorithms. However, any method of audio track isolation, e.g., separation of the audio channel from the video channel of a video recording, can be implemented.

In some implementations, the audio track isolator 210 receives the collection of video recordings from the video recordings database 202, e.g., utilizing the network interface 220. The audio track isolator 210 can isolate the audio channel of one or more, or each, of the video recordings of the collection of video recordings, e.g., isolates the audio channel from the video channel, prior to the metadata filter 208 receiving the collection of video recordings. In some examples, the audio track isolator 210 provides the audio channel of the collection of video recordings and associated metadata to the metadata filter 208.

The melody line extractor 212 receives the audio channel, e.g., audio portion, of the set of candidate videos from the audio track isolator 210. In some examples, the melody line extractor 212 receives the audio channel, e.g., audio portion, of the set of candidate videos from the metadata filter 208. The melody line extractor 212 extracts a monophonic melody from one or more, or each, of the candidate videos of the set of candidate videos. In some implementations, melody extraction of the audio channel of the candidate videos includes estimating a fundamental frequency corresponding to a pitch of a melody line of the audio channel of the candidate videos. However, any method of melody line extraction, e.g., of the audio channels of the candidate videos, can be implemented.

The clusterer 214 receives the set of candidate videos, and specifically, the monophonic melody lines of the set of candidate videos from the melody line extractor 212. The clusterer 214 selects from among the set of candidate videos, a subset of the candidate videos based on a similarity of the monophonic melody lines of the candidate videos of the subset of candidate videos with each other. For examples, the clusterer 214 receives the extracted monophonic melody lines of each of the candidate videos of the set of candidate videos from the melody line extractor 212 and clusters, e.g., groups, the set of candidate videos into one or more subsets of candidate videos based on a similarity of the video candidates, that is, based on a similarity of the monophonic melody lines of each of the candidate videos. Thus, each subset of candidate videos includes candidate videos that are similar to one another based on the monophonic melody lines of the candidate videos of the subset. In some examples, the clusterer 214 groups the candidate videos of the set of candidate videos based on a comparison of the monophonic melody lines of the respective candidate videos. For example, the comparison can include a pair-wise comparison. In some examples, the clusterer 214 can identify two or more subsets of the candidate videos, wherein each subset is based on a similarity of the monophonic melody lines of the candidate videos of the respective subset.

In some implementations, based upon the comparison of the candidate videos, e.g., the monophonic melody lines of the candidate videos, of the set of candidate videos, the clusterer 214 can generate a graph of the subsets of the candidate videos. For example, the graph can include one or more nodes representing the one or more candidate videos of the subset of candidate videos, and can include one or more edges defined between the nodes that represent the similarity of the candidate videos to one another. In some examples, the graph is a weighted, undirected graph.

In some implementations, the similarity associated with each edge, e.g., the similarity between any two monophonic melody lines associated with the respective candidate videos, is compared to a threshold. In some examples, the threshold can indicate a desired level of similarity between the monophonic melody lines associated with the respective candidate videos to be considered as belonging to the same subset of candidate videos, e.g., cluster, or grouping. In some examples, the threshold is an empirically determined threshold. Thus, edges having a similarity less than the similarity threshold are filtered, e.g., removed from the graph. As a result, in some examples, the graph is a non-weighted, undirected graph. In some examples, when a particular node has no edges connecting the particular node to other nodes of a particular subset of candidate videos, e.g., cluster, the node and the corresponding candidate video is filtered, e.g., removed.

In some implementations, the subset of candidate videos includes a clique of candidate videos from the set of candidate videos. In some examples, a clique of candidate videos can include two or more nodes where each node includes, or is associated with, an edge to each other node of the subset, e.g., cluster. For example, in a particular cluster, associated with a subset of candidate videos, including three nodes, each node would have, or be associated with, two edges to each of the other two nodes. In some implementations, the particular cluster includes a paraclique of candidate videos from the set of candidate videos. In some examples, a paraclique of candidate videos include two or more nodes where a particular node of the nodes includes an edge to a proper subset of the nodes of the paraclique of candidate videos. A proper subset of the nodes of the paraclique of candidate videos includes a subset of nodes which is not as the same as the original set of nodes, that is, the proper subset of nodes of the paraclique of candidate videos excludes at least one node of the paraclique. For example, in a particular cluster, associated with a subset of candidate videos, including three nodes, a particular node is connected to only one other node through an edge, and is not connected to the other node. In some examples, for a graph including N nodes, a particular cluster of nodes is an paraclique when N is less than or equal to a threshold, e.g., 4 and the particular cluster is a clique, that is, a clique with a number of nodes less than the threshold. In some examples, for a graph including N nodes, a particular cluster of nodes is an paraclique when N is greater than the threshold, e.g., 4, and has a minimum degree of (N+3)/2. However, other implementations of a clique of candidate videos and a paraclique of candidate videos are possible.

In some implementations, the graph can include two or more clusters of nodes representing two or more subsets of the candidate videos. Thus, in some examples, the clusterer 214 selects from among the set of candidate videos, one of the two or more subsets of the candidate videos. Selecting one of the two or more subsets of the candidate videos can include selecting based on one or more criteria, such as a number of candidate videos associated with each respective subset. For example, the subset of candidate videos that is associated with a cluster having the greatest number of nodes as compared to the other clusters of nodes included by the graph is selected. However, other implementations of selecting the one of the two or more subsets of the candidate videos are possible.

In some examples, when the graph includes two or more paracliques, one of the paracliques can be selected, e.g., the one of the two or more subset of the candidate videos is selected, by determining the maximum paraclique. The maximum paraclique can be determined by iteratively removing the least-connected node from the graph, e.g., the node associated with the fewest number of edges. Thus, the biggest connected cluster is selected, and the corresponding subset of candidate videos is selected.

The melody database 222 receives the monophonic melody lines of the subset of the candidate videos and the identifier, or identifiers, associated with the subset of the candidate videos, and stores an association between the monophonic melody lines of the subset of the candidate videos and the identifier, or identifiers, associated with the subset of the candidate videos. For example, the association can be stored by one or more tables associated with the melody database 222. In some examples, the melody database 222 can be indexed, and searchable.

In some examples, the extracted monophonic melody of each of the candidate videos of the subset of the candidate videos is associated with the identifier of the subset of the candidate videos. In some examples, the extracted monophonic melody from a particular candidate video of the subset of candidate videos that has a maximum cumulative similarity, e.g., based on the similarity with the other candidate videos of the subset, as compared to the other candidate videos of the subset is associated with the identifier of the subset of the candidate videos. In some examples, the maximum cumulative similarity of the particular candidate video can be a summation of the similarity scores associated with the one or more edges associated with the node representing the particular candidate video, e.g., of the graph. For example, in the graph, each node representing the candidate videos of the subset can have an associated similarity score. The similarity score for each node is based on the similarity of the edges associated with each respective node.

The recognizer 216 receives an audio input signal, and provides identification information in response to and related to the audio input signal. Specifically, the recognizer 216 can recognize a melody associated with the audio input signal. For example, the audio input signal can include human generated audio, that is, human sounds produced by a human voice. In some examples, the human sounds can include singing, humming, speaking, or any type of vocal cord sounds, as described above. The recognizer 216 obtains the melody line, e.g., the monophonic melody line, associated with the audio input signal, e.g., utilizing the melody line extractor 212, and compares the melody line of the audio input signal to the monophonic melody lines stored by the melody database 222. Based on the comparison, the recognizer 216 matches the melody line of the audio input signal to at least one of the monophonic melody lines stored by the melody database 222, and thus, further identifies an identifier, or identifiers, associated with the matched monophonic melody lines. The recognizer 108 provides this identifier, or identifiers, in response to receiving the audio input signal.

The processor 218 can process instructions for execution within the server 204, including such as instructions relating to isolating a monophonic melody line of a polyphonic audio signal, e.g., of an audio track of a video recording, and associating the monophonic melody line with an identifier. In some implementations, multiple processors and/or multiple buses may be used, as appropriate, along with multiple memories and types of memory. Also, multiple servers 204 may be connected, with each server 204 providing portions of the necessary operations, e.g., as a server bank, a group of blade servers, or a multiprocessor system.

The server 204 may communicate with the recordings data base 202 through the network interface 220, which may include digital signal processing circuitry where appropriate. The network interface 220 may provide for communications under various modes or protocols. Such communication may occur, for example, through a radio-frequency transceiver (not shown).

Figure 3:
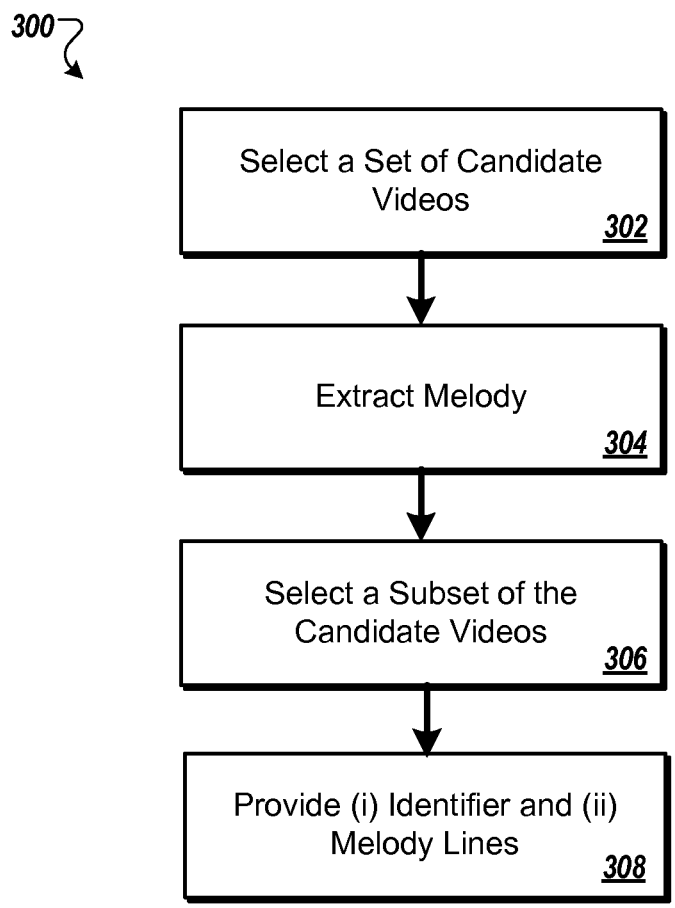
FIG. 3 depicts a flowchart of an example process for isolating a monophonic melody line of a polyphonic audio.

FIG. 3 depicts a flowchart of an example process 300 for isolating a monophonic melody line of a polyphonic audio signal, e.g., of an audio track of a video recording. The example process 300 can be executed using one or more computing devices. For example, the system 200 can be used to execute the example process 300.

A set of candidate videos are selected (302). Specifically, the set of candidate videos are selected from among a collection of videos, and that (i) are identified as being associated with a particular song, and that are (ii) classified as a cappella video recordings. For example, the metadata filter 208 processes a collection of video recordings received from the video recordings database 202, including selecting the set of candidate videos that are (i) identified as being associated with a particular song, and (ii) are classified as a cappella video recordings. In some examples, the metadata filter 208 selects the set of candidate vides based on text associated with the candidate videos, including keywords associated with the text.

A monophonic melody is extracted (304). Specifically, from each of the candidate videos of the set of candidate videos, the monophonic melody is extracted from an audio channel of the respective candidate video. For example, the melody line extractor 212 processes the set of candidate videos received from the metadata filter 208, the audio track isolator 210, or both, including extracting the monophonic melody line from one or more, or each, of the candidate videos of the set of candidate videos.

A subset of the candidate videos are selected (306). Specifically, the subset of candidate videos are selected from among the set of candidate videos, and is based on a similarity of the monophonic melody line of the candidate videos of the subset with each other. For example, the clusterer 214 process the monophonic melody lines of the candidate videos of the set of candidate videos received from the melody line extractor 212, including clustering, e.g., grouping, the set of candidate videos into one or more subsets of candidate videos based on a similarity of the candidate videos, that is, based on a similarity of the monophonic melody lines of each of the candidate videos. In some examples, the clusterer 214 groups the candidate videos of the set of candidate videos based on a comparison of the monophonic melody lines of the respective candidate videos.

An (i) identifier of the particular song and (ii) one or more monophonic melody lines of the candidate videos of the subset of candidate videos are provided to a recognizer. Specifically, the recognizer 216 recognizes songs from sounds produced by a human voice. For example, the clusterer 214 can provide the identifier of the particular song and (ii) one or more monophonic melody lines of the candidate videos of the subset of candidate videos are provided to the recognizer 216.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:
1. A computer-implemented method comprising:
selecting, from among a set of items of uploaded content, a first candidate training subset of the items of uploaded content that (i) each has a respective textual label that includes particular text that is indicative of a presence of a sound of a human voice, and of an absence of background sounds that include sounds other than that of a human voice, and (ii) are associated with a particular entity;

for each of the items of uploaded content of the first candidate training subset that (i) each has a respective textual label that includes particular text that is indicative of a presence of a sound of a human voice, and of an absence of background sounds that include sounds other than that of a human voice, and (ii) are associated with a particular entity, obtaining one or more acoustic features that are extracted from the item of uploaded content of the first candidate training subset;

selecting, from among the first candidate training subset of the items of uploaded content, a second, filtered candidate training subset of the items of uploaded content that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first subset; and using one or more respective acoustic features of one or more of the items of uploaded content of the second, filtered candidate training subset that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first candidate training subset in recognizing whether a subsequently received audio sample is likely also associated with the particular entity.

2. The method of claim 1, wherein the set of items of uploaded content comprises a video on a website that hosts user-generated content.

3. The method of claim 1, wherein a textual label comprises a title of an item of uploaded content.

4. The method of claim 1, wherein each of the items of uploaded content is assigned a textual label by a respective uploader of the item of uploaded content.

5. The method of claim 1, wherein selecting the second filtered candidate training subset of the items of uploaded content from the first candidate training subset of the items of uploaded content comprises clustering the items of uploaded content of the first candidate training subset.

6. The method of claim 1, wherein using one or more respective acoustic features of one or more of the items of uploaded content of the second, filtered candidate training subset in recognizing whether a subsequently received audio sample is likely also associated with the particular entity comprises training an automated recognition system using the one or more respective acoustic features.

7. The method of claim 1, wherein selecting a first candidate training subset of the items of uploaded content that are associated with a particular entity comprises selecting the items of uploaded content that each has a respective textual label that identifies the particular entity.

8. The method of claim 1, wherein using one or more respective acoustic features of one or more of the items of uploaded content of the second filtered candidate training subset in recognizing whether a subsequently received audio sample is likely also associated with the particular entity comprises determining whether the subsequently received audio sample likely includes a recording of the particular entity.

9. The method of claim 1, wherein a textual label that includes particular text that is indicative of a presence of a sound of a human voice, and of an absence of background sounds that include sounds other than that of a human voice comprises particular text that is indicative of an absence of instrumental sounds.

10. A system comprising:
one or more computers and one or more storage devices storing instructions that are operable, when executed by the one or more computers, to cause the one or more computers to perform operations comprising:

selecting, from among a set of items of uploaded content, a first candidate training subset of the items of uploaded content that (i) each has a respective textual label that includes particular text that is indicative of a presence of a sound of a human voice, and of an absence of background sounds that include sounds other than that of a human voice, and (ii) are associated with a particular entity;

for each of the items of uploaded content of the first candidate training subset that (i) each has a respective textual label that includes particular text that is indicative of a presence of a sound of a human voice, and of an absence of background sounds that include sounds other than that of a human voice, and (ii) are associated with a particular entity, obtaining one or more acoustic features that are extracted from the item of uploaded content of the first candidate training subset;

selecting, from among the first candidate training subset of the items of uploaded content a second, filtered candidate training subset of the items of uploaded content that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first subset; and using one or more respective acoustic features of one or more of the items of uploaded content of the second, filtered candidate training subset that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first candidate training subset, in recognizing whether a subsequently received audio sample is likely also associated with the particular entity.

11. The system of claim 10, wherein the set of items of uploaded content comprises a video on a website that hosts user-generated content.

12. The system of claim 10, wherein a textual label comprises a title of an item of uploaded content.

13. The system of claim 10, wherein each of the items of uploaded content is assigned a textual label by a respective uploader of the item of uploaded content.

14. The system of claim 10, wherein selecting the second filtered candidate training subset of the items of uploaded content from the first candidate training subset of the items of uploaded content comprises clustering the items of uploaded content of the first candidate training subset.

15. The system of claim 10, wherein using one or more respective acoustic features of one or more of the items of uploaded content of the second filtered candidate training subset in recognizing whether a subsequently received audio sample is likely also associated with the particular entity comprises training an automated recognition system using the one or more respective acoustic features.

16. The system of claim 10, wherein selecting a first candidate training subset of the items of uploaded content that are associated with a particular entity comprises selecting the items of uploaded content that each has a respective textual label that identifies the particular entity.

17. The system of claim 10, wherein using one or more respective acoustic features of one or more of the items of uploaded content of the second filtered candidate training subset in recognizing whether a subsequently received audio sample is likely also associated with the particular entity comprises determining whether the subsequently received audio sample likely includes a recording of the particular entity.

18. A non-transitory computer-readable storage device storing software comprising instructions executable by one or more computers which, upon such execution, cause the one or more computers to perform operations comprising:
   selecting, from among a set of items of uploaded content, a first candidate training subset of the items of uploaded content that (i) each has a respective textual label that includes particular text that is indicative of a presence of a sound of a human voice, and of an absence of background sounds that include sounds other than that of a human voice, and (ii) are associated with a particular entity;
   for each of the items of uploaded content of the first candidate training subset that (i) each has a respective textual label that includes particular text that is indicative of a presence of a sound of a human voice, and of an absence of background sounds that include sounds other than that of a human voice, and (ii) are associated with a particular entity, obtaining one or more acoustic features that are extracted from the item of uploaded content of the first candidate training subset;
   selecting, from among the first candidate training subset of the items of uploaded content, a second, filtered candidate training subset of the items of uploaded content that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first subset; and
   using one or more respective acoustic features of one or more of the items of uploaded content of the second, filtered candidate training subset that (i) each has a respective textual label that includes particular text that is indicative of a presence of a sound of a human voice, and of an absence of background sounds that include sounds other than that of a human voice, (ii) are associated with a particular entity, and (iii) each has acoustic features that are indicated as similar to acoustic features of one or more other items of uploaded content of the first candidate training subset in recognizing whether a subsequently received audio sample is likely also associated with the particular entity.

19. The computer-readable storage device of claim 18, wherein the set of items of uploaded content comprises a video on a website that hosts user-generated content.

20. The computer-readable storage device of claim 18, wherein a textual label comprises a title of an item of uploaded content.

21. The computer-readable storage device of claim 18, wherein each of the items of uploaded content is assigned a textual label by a respective uploader of the item of uploaded content.

* * * * *